United States Patent [19]

Fujii

[11] 4,249,983
[45] Feb. 10, 1981

[54] METHOD AND APPARATUS FOR PRODUCTION OF LAMINATED AND SHAPED TRIM PANEL OF CORRUGATED PAPERBOARD BASE

[75] Inventor: Toshihiko Fujii, Yokohama, Japan

[73] Assignee: Nissan Motor Company, Limited, Yokohama, Japan

[21] Appl. No.: 56,593

[22] Filed: Jul. 11, 1979

Related U.S. Application Data

[62] Division of Ser. No. 815,437, Jul. 13, 1977.

[30] Foreign Application Priority Data

Jul. 14, 1976 [JP] Japan .................................. 51-84209
Jul. 21, 1976 [JP] Japan .................................. 51-87070

[51] Int. Cl.³ ............................................. B29C 17/00
[52] U.S. Cl. .................................... 156/475; 156/556
[58] Field of Search ............... 156/475, 443, 221–224, 156/212, 214, 229, 494, 468, 556, 557, 583.1, 220, 219, 380; 425/301, 305.1, 414

[56] References Cited

U.S. PATENT DOCUMENTS

| | | | |
|---|---|---|---|
| 1,867,224 | 7/1932 | Lange | 156/222 X |
| 2,149,507 | 3/1939 | Camfield | 156/224 X |
| 2,988,129 | 6/1961 | Kevelin et al. | 156/222 X |
| 3,697,369 | 10/1972 | Ambeng et al. | 156/224 X |
| 3,964,953 | 6/1976 | Mitchand et al. | 271/91 X |

*Primary Examiner*—David A. Simmons

[57] ABSTRACT

A trim panel, which is composed of a substrate of corrugated paperboard and a decorative and/or protective skin layer, is produced by press-forming the substrate into a desired shape by a hot-press, parting the movable die of the press from the stationary die to leave the shaped substrate in the latter die, dragging a sheet material employed as the skin into the press so as to stretch above the shaped substrate, and pressing the stretched skin material against the shaped substrate, interposing an adhesive layer therebetween unless the skin material has an adhesive property, with application of heat to accomplish adhesion. The hot-press is combined with a substrate feed mechanism and a skin material feed mechanism which includes a piston rod with a sheet-grasping device mounted thereon and can serve also the function of withdrawing the shaped and laminated product from the stationary die. At the second pressing, adjustment of the clearance between the dies according to the thickness of the skin is effective for achieving a uniform adhesion of the skin to the substrate without deforming the substrate.

10 Claims, 8 Drawing Figures

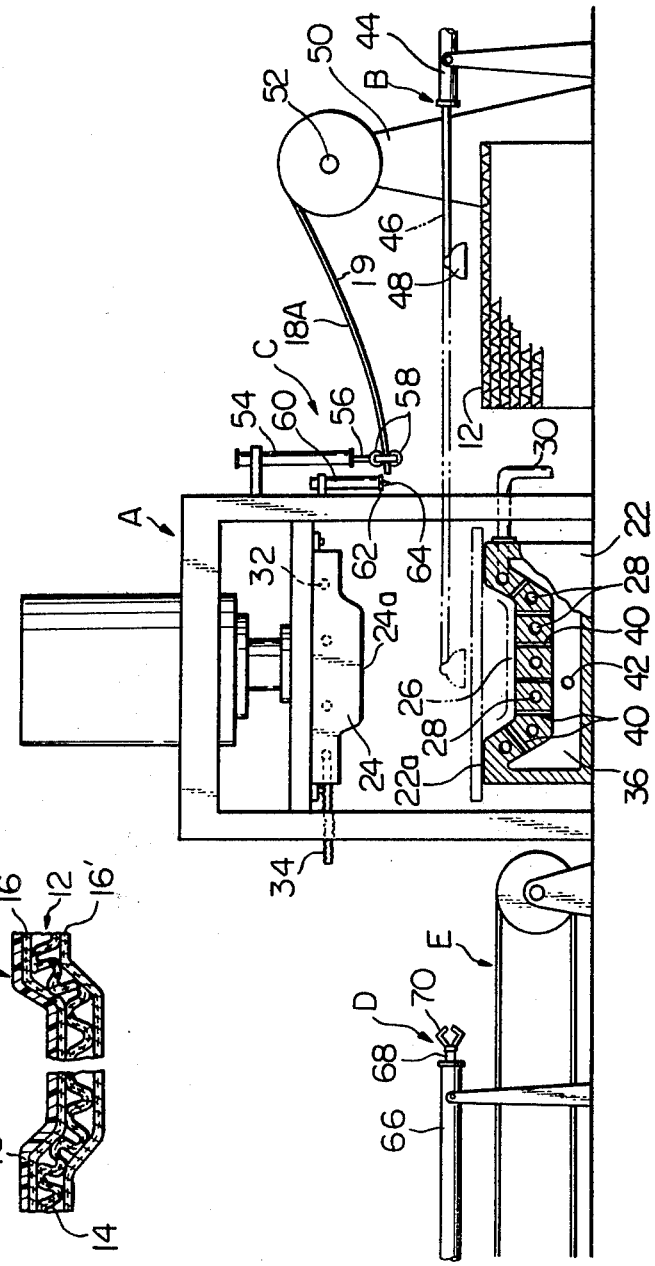
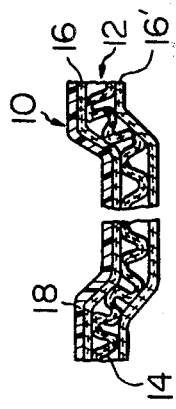

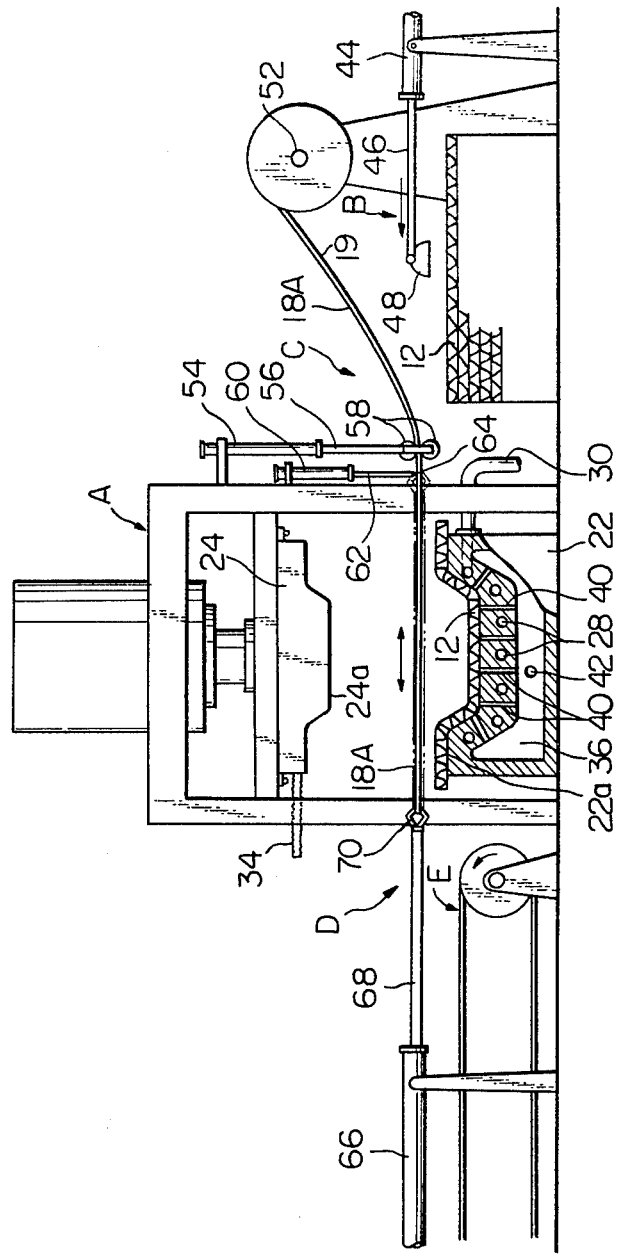

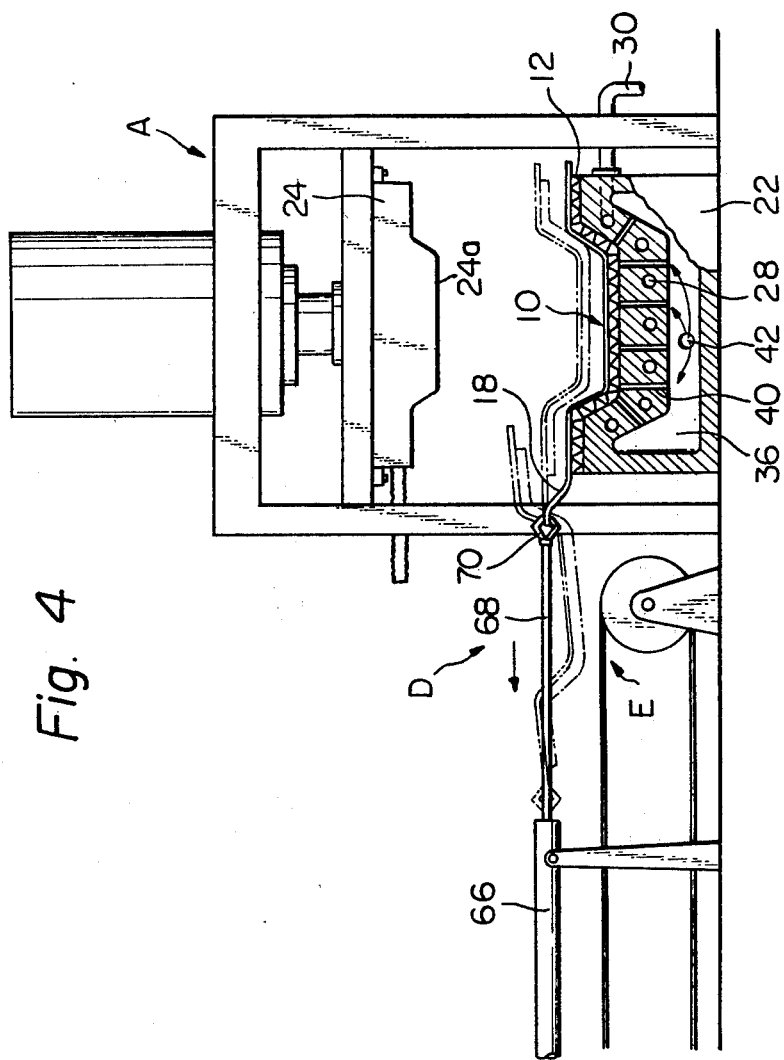

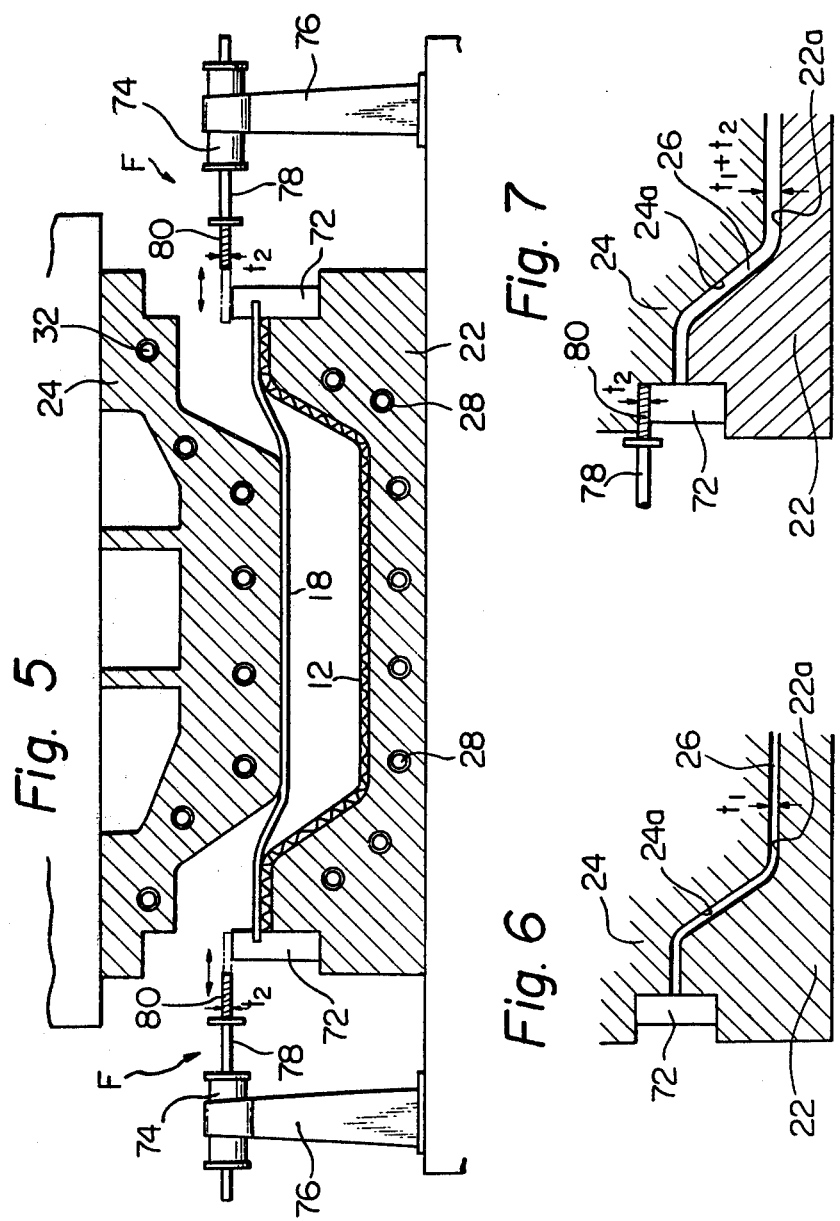

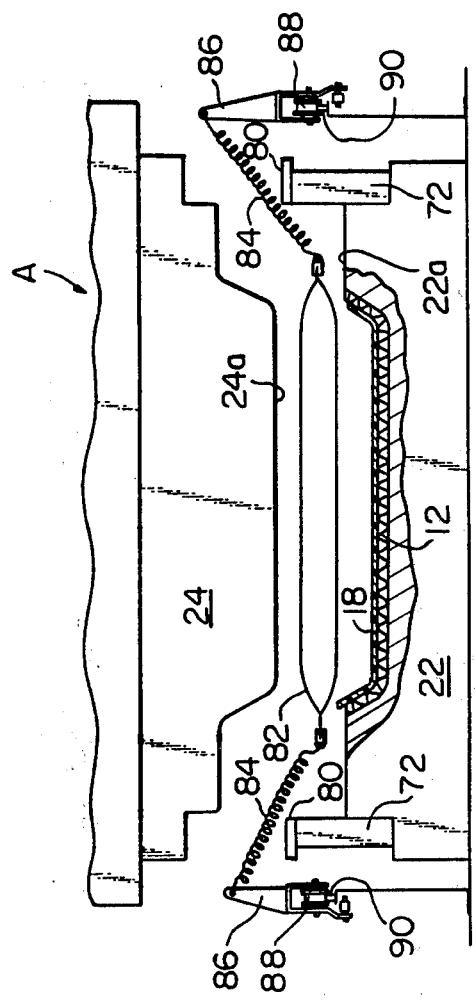

METHOD AND APPARATUS FOR PRODUCTION OF LAMINATED AND SHAPED TRIM PANEL OF CORRUGATED PAPERBOARD BASE

This is a division of application Ser. No. 815,437 filed July 13, 1977.

BACKGROUND OF THE INVENTION

This invention relates to a method and apparatus for the production of a wall covering material for room interior uses, which material takes the form of a shaped board and is composed of a substrate of corrugated paperboard and a skin intimately laid on one side of the substrate.

In the field of wall covering materials to afford comforts and/or decorative effect to the interior of cars, ships and buildings, corrugated paperboard has recently attracted industrial attention as a basic material because of its cheapness and light weight compared with prevailing materials such as a resin-impregnated felt. In many cases, particularly for use in the interior of cars, a wall covering material needs to be shaped at production stage so as to readily be applicable to a curved wall or ceiling of, for example, an automobile passenger compartment. Furthermore, when the wall covering material is of corrugated paperboard, one side of the corrugated paperboard must be laid with a skin layer which has decorative and/or protective effects and may optionally have a cushioning function too. In the present invention, a wall covering material which is composed of a substrate of corrugated paperboard and a decorative and/or protective skin laid on one side of the substrate and takes the form of a suitably shaped board will be called trim panel.

At present, a trim panel of the described type is produced by a two-stage process; firstly a flat board of corrugated paperboard employed as the substrate is press-formed into an intended shape (with application of heat when the corrugated paperboard employs a thermoplastic resin as the adhesive for joining the liners to the corrugated medium), and then a sheet material employed as the skin is laid on the shaped substrate, with application of heat so as to soften an adhesive, by means of either a separate press for molding and laminating or a vacuum molding and laminating apparatus. The provision of a molding and laminating apparatus, in addition to a hot-press for the shaping of the substrate, and a large space for the transfer of the shaped substrate to the laminating apparatus are indispensable requisites to this type of two-stage process. This means a need of considerable cost of facilities. Besides, the described process has a technical and industrial disadvantage that the once heated substrate is inevitably cooled upon withdrawal from the hot-press for the first stage and hence must again be heated at the subsequent skin-laminating stage.

It is an object of the present invention to eliminate these disadvantages of conventional two-stage processes for the production of trimming panels of the described type.

It is another object of the invention to provide an improved method of producing a trim panel of the described type, which method needs only one set of molding and laminating apparatus for accomplishing the shaping of a corrugated paperboard substrate and the laying of the shaped substrate with a skin and accordingly is far less expensive than conventional production methods.

It is still another object of the invention to provide a molding and laminating apparatus for efficiently producing a high quality trim panel of the described type.

According to the invention, a method of producing a laminating and shaped trim panel having a substrate of corrugated paperboard and a decorative and/or protective skin layer comprises the steps of (a) press-forming the substrate into a desired shape by means of a hot-press having a stationary die and a movable die, (b) parting the movable die from the stationary die to leave the shaped substrate in the latter die, (c) stretching a sheet material employed as the skin above the shaped substrate without removing the shaped substrate from the stationary die, (d) providing a layer of an adhesive material which is operative at an elevated temperature between the sheet material and the substrate prior to the step (c) unless the sheet material has an adhesive property at an elevated temperature, and (e) pressing the stretched sheet material against the shaped substrate with application of heat to aid the shaping of the skin and accomplish the adhesion of the skin to the shaped substrate.

The step (d) is accomplished by preliminarily laying one side of the material of the skin with the adhesive material of the described type or alternatively by preliminarily laying one side of the substrate with the same type of adhesive material prior to the step (a).

When the skin has a substantial thickness, the production method includes the step of increasing the height of the clearance between the stationary and movable dies in the engaged state according to the thickness of the skin after the step (b) but before the step (e). Furthermore, the pressing for the adhesion of the skin to the shaped substrate may be accomplished with the interposal of a pad between the skin and the movable die.

A molding and laminating apparatus according to the invention comprises a hot-press having a stationary die and a movable die, a substrate feed means for setting a flat substrate of corrugated paperboard in the stationary die, a skin feed means for stretching a sheet material employed as the skin between the stationary die and the movable die while the movable die is parted from the stationary die.

Preferably the skin feed means comprise an actuator having a piston rod with a sheet-gasping device mounted on its free end, arranged such that the piston rod and the grasping device serve not only the function of dragging the sheet material into the hot-press but also the function of withdrawing the shaped and laminated trim panel from the stationary die.

The hot-press is preferably provided with a clearance adjustment mechanism to selectively make the magnitude of the clearance between the stationary and movable dies in the engaged state correspond to the thickness of the shaped substrate and the total thickness of the shaped substrate and the skin. In addition, the apparatus may include a mechanism for optionally introducing a pad, which is useful at the pressing of the skin against the shaped substrate as an interposition, into a space between the two dies and taking it out after the pressing operation.

According to the invention, a trim panel of the described type can be produced by the use of only a single set of apparatus without moving the substrate during sequential shaping and laminating procedures. The production, therefore, can be accomplished with greatly lessened investments for facilities and lowered operating costs compared with the production of the same panel by conventional methods. The adjustment of the clearance between the two dies according to the thickness of the skin and the interposal of a pad between the skin and the movable die are quite effective for the achievement of a complete and uniform adhesion of the skin to the substrate without damaging or deforming the shaped substrate.

BRIEF DESCRIPTION OF THE DRAWINGS

FIG. 1 is a sectional view of a trim panel produced by a method according to the invention, showing a laminated structure of the panel;

FIG. 2 is an elevational view, partly in section, of a molding and laminating apparatus according to the invention for producing the trim panel of FIG. 1;

FIG. 3 shows a state of the apparatus of FIG. 2, in the same view, at an intermediate stage of a molding and laminating process;

FIG. 4 shows a product release action of the same apparatus in the same view;

FIG. 5 is a fragmentary and elevational view, partly in section, of a molding and laminating apparatus as a slight modification of the apparatus of FIG. 2;

FIG. 6 is a sectional view of a part of the apparatus of FIG. 5, showing the position of its movable die at an initial molding state of a molding and laminating process;

FIG. 7 shows the position of the same movable die at a subsequent laminating stage; and FIG. 8 shows the provision of a pad-carrying mechanism to a hot-press in a molding and laminating apparatus according to the invention.

DESCRIPTION OF PREFERRED EMBODIMENTS

FIG. 1 shows the construction of a trim panel 10 the production of which is the theme of the invention. The illustrated shape of the panel 10 should be taken as merely by way of example. The basic material or substrate of the trim panel 10 is corrugated paperboard 12 which consists of a corrugated medium 14 of paper and two sheets of paper liners 16 and 16' respectively laid on the two sides of the corrugated medium 14. A thermoplastic resin is preferably used as the adhesive for joining the liners 16, 16' to the corrugated medium 14. The trim panel 10 has a skin 18 intimately laid on one side of the corrugated paperboard substrate 12 for decorative and/or protective effects. The material of the skin 18 is usually a relatively soft plastics which may optionally be foam plastics. Various fabrics and leather are also useful as the material of the skin 18. The skin 18 is adhered to the substrate 12 in most cases by means of an adhesive of hot-melt type. When, however, the skin 18 is of a thermoplastic resin such as polyethylene, the adhesion can be accomplished by sufficiently softening the skin 18 by application of heat, using no extra adhesive.

Referring to FIG. 2, a molding and laminating apparatus according to the invention is a combination of four kinds of mechanism: a hot-press A, a substrate feed mechanism B and a skin material feed mechanism C which includes a drag mechanism D. A conveyer system such as a belt conveyer E is supplemented to this apparatus for the conveyance of the product.

The hot-press A has a stationary die 22 in a lower position and a vertically movable die 24 above the stationary die 22. The upper surface 22a of the die 22 and the lower surface 24a of the die 24 are shaped in accordance with the intended shape of the trim panel 10. Conveniently, the stationary die 22 is made to be a female die and the movable die 24 a male die as illustrated in FIG. 2. The dies 22 and 24 are designed such that a clearance 26 corresponding to the shape and thickness of the trim panel 10 is established between the shaped regions of the die faces 22a and 24a when the movable die 24 is lowered to engage with the stationary die 22 as shown by phantom line. The stationary die 22 is provided with a heater conduit 28 to which a heated fluid is supplied through an external duct 30. Similarly the movable die 24 is provided with a heater conduit 32 connected to a heated fluid duct 34. The stationary die 22 is made hollow so as to define therein a space 36 below the heater conduit 28, and a plurality of holes 40 of small cross-sectional areas are formed in the die 22 to extend from the shaped face 22a to this space 36. A duct 42 connects the space 36 to an air blower (not shown).

Flat sheets of corrugated paperboard 12, which are already cut into a suitable plan view geometry each to serve as the substrate of the trim panel 10, are stacked on one side (right side in FIG. 2) of the hot-press A. The substrate feed mechanism B has a pneumatic or hydraulic actuator 44, which has a fairly long and horizontally movable piston rod 46, and a vacuum cup 48 attached to the free end of the piston rod 46. The vacuum cup 48 is directed downward so as to suck up the uppermost one of the stacked corrugated paperboard sheets 12 when suction is effected. The actuator 44 can extend its piston rod 46 to such an extent that the sucked sheet 12 can be transferred to the stationary die 22. Alternatively, the substrate feed mechanism B may employ a swing-arm.

The skin material feed mechanism C has a support 50, which stands on the same side of the hot-press A as the substrate feed mechanism B does, to hold a horizontal shaft 52 at a height somewhat above the plane of the die face 22a. A sheet material as the material of the skin 18 takes the form of a rolled belt 18A mounted on the shaft 52. In this example, the lower side (inside in the rolled state) of the sheet material 18A is laid with a hot-melt sheet 19 (of polyethylene, for example). A pneumatic or hydraulic actuator 54 is attached to a right side frame of the hot-press A such that its piston rod 56 can extend vertically downwards and retreat upwards with a short distance from the hot-press A. A pair of rolls 58, which are in the style of pinch rolls, are mounted on the free end of this piston rod 56 and can pass the free end of the rolled belt 18A therebetween with the exertion of a friction force. The rolls 58 are sufficiently long cylinders so as to hold the belt 18A nearly horizontally. Alternatively, too identical actuators (54) may be arranged in a vertical plane at a distance near the width of the belt 18A each with a pair of relatively short cylindrical rolls (58). The skin material feed mechanism C includes a traverser (omitted from the illustration) which carries a vertically oriented pneumatic or hydraulic cylinder 60 to move parallel to and axially of the shaft 52 within a vertical plane interposing between the actuator 54 and the hot-press A over the entire width of the belt 18A of the sheet material. This cylinder 60 has a downwardly extendable piston rod 62 with a cutter blade 64 attached to its free end.

The drag mechanism D has a pneumatic or hydraulic actuator 66 arranged horizontally and located on the opposite side (left side in FIG. 2) of the hot-press A with respect to the skin material feed mechanism C. A piston rod 68 of this actuator 66 has sheet-grasping means such as a pair of jaws 70 at its free end. In plan view, the jaws 70 are approximately of the same width as the stationary die 22 and the belt 18A. The piston rod 68 extends towards the hot-press A, keeping a small height above the upper end of the stationary die 22, such that the jaws 70 travel over the entire width of the die 22. Besides, the actuator 66 can hold the piston rod 68 in a half-extended state such that the jaws 70 take a position close to the left side (a side nearest to the actuator 66) of the stationary die 22. The two actuators 54 and 66 are designed and arranged such that the middle of the paired rolls 58 and the axis of the piston rod 68 are in the same horizontal plane when the rolls 58 take the lowered position.

The operation of the apparatus of FIG. 2 and the procedures of a production method according to the invention are as follows. As can be understood without particular explanation, the apparatus is provided with a control unit (not shown) for sequentially operating the hot-press A, the actuators 44, 54, 60, 66 and the jaws 70.

At the start of the operation, the movable die 24 takes an upwardly retreated position with an ample distance from the stationary die 22, and all the actuators are in retreated state. At this state vacuum is applied to the vacuum cup 48 of the substrate feed mechanism B so as to catch the uppermost one of the stacked corrugated paperboard substrates 12. Then the actuator 44 is operated to extend its piston rod 46 as shown by phantom line in FIG. 2 till the vacuum cup 48 reaches just above the stationary die 22. The substrate 12 is placed on the stationary die 22 by interrupting the application of vacuum to the vacuum cup 48, and the piston rod 46 is retreated. These movements of the piston rod 46 (and the transfer of the substrate 12) are not obstructed in the least by the belt 18A since the actuator 54 keeps the rolls 58 and hence the free end of the belt 18A well above the path of the piston rod 46.

Next, the movable die 24 is lowered so as to press the flat substrate 12 against the shaped face 22a of the stationary die 22. This press-forming operation is accomplished with application of heat to the dies 22 and 24 when the corrugated paperboard 12 utilizes a thermoplastic resin as the adhesive.

The movable die 24 is retreated upwards upon completion of the press-forming and at the same time the actuator 54 of the skin material feed mechanism C is operated so as to lower the rolls 58 as shown in FIG. 3. Then the actuator 66 of the drag mechanism D is operated so as to maximumly extend the piston rod 68, and the jaws 70 are put into action so as to catch the free end of the belt of the sheet material 18A as shown by phantom line in FIG. 3. This can be done since the rolls 58 in the lowered position hold the free end of the belt 18A in a horizontal plane in which moves the piston rod 68. Then the piston rod 68 retreats to cause unrolling of the belt 18A until the jaws 70 reach the aforementioned position near the left side of the stationary die 22 (as shown in FIG. 3). When the piston rod 68 stops to keep the jaws 70 in this position, the sheet material 18A is horizontally stretched within the hot-press A to lie slightly above the shaped substrate 12 with certain tension due to the grasping with jaws 70 and the friction force of the rolls 58.

In this state, the dies 22 and 24 are heated and the movable die 24 is again lowered so as to press the sheet material 18A i.e. skin 18, against the shaped substrate 12 which is retained in the stationary die 22. Consequently, the hot-melt sheet 19 on the lower side of the skin 18 melts and causes the adhesion of the skin 18 to the shaped substrate 12 over the entire area. Then the cylinder 60 is actuated to lower the piston rod 62 until the cutter blade 64 comes into contact with the tensioned belt 18A, followed by the operation of the traverser, resulting in the cutting of the belt 18A. Thereafter the rolls 58, the cutter blade 64 and the movable die 24 are retreated upwards. In this state, the piston rod 68 is completely retreated as shown by phantom line in FIG. 4 (the same state as in FIG. 2). Since the jaws 70 still graps the skin 18, the complete retreat of the piston rod 68 results in pulling out of the shaped trimming panel 10 from the stationary die 22 as illustrated by phanton line in FIG. 4. To facilitate the withdrawal of the product 10 from the stationary die 22, air may be blown against the lower side of the pressformed substrate 12 through the duct 42, space 36 and the holes 40. When the product 10 is pulled onto the belt conveyer E, the jaws 70 are opened to release the product 10.

As an alternative way to he preliminary laying of the lower side of the skin material 18A with the hot-melt sheet 19, the upper side of the substrate 12 may be laid with a hot-melt sheet of a corresponding size prior to the press-forming of the substrate 12. In this case the sticking of the melted hot-melt sheet to the movable die 24 at the press-forming of the substrate 12 should be precluded by a certain measure, for example by coating the surface 24a of the movable die 24 with a fluorine-containing nonadhesive resin such as polytetrafluoroethylene.

The foregoing description with reference to FIGS. 2-4 was given on the assumption that the thickness of the skin 18 is far smaller than that of the substrate 12 and practically negligible. When a sheet material of a substantial thickness, for example a laminated sheet given by laminating a urethane-foam sheet and a polyvinyl chloride sheet, the hot-press A needs to be provided with certain means for adjusting the magnitude of the clearance 26. If the press-forming of the substrate 12 and the laminating of the relatively thick skin 18 are performed with the clearance 26 of the fixed magnitude, the laminating operation will exert an excessive load on the substrate 12 and accordingly cause a deformation, or even crush, of the once appropriately shaped substrate 12.

The inconvenience of a fixed clearance 26 between the dies 22 and 24 is particularly significant when the clearance 26 is not made to have a uniform magnitude over the entire area of the shaped face 22a of the die 22 but has a relatively small magnitude in certain areas. When the intended shape of the trim panel 10 is such that the corrugated paperboard substrate 12 is bulged or dented with small radii of curvature in certain limited areas at the press-forming operation, the magnitude of the clearance 26 in such areas is sometimes made smaller than a standard magnitude (corresponds to the thickness of the substrate 12) in the remaining areas in order to somewhat crush the corrugated paperboard in the bulged or dented areas with the purpose of preventing appearance of wrinkles in these areas. After the press-forming operation, the thickness of the substrate 12 in the thus crushed areas tends to increase due to a certain extent of spring-back and becomes larger than the reduced magnitude of the clearance 26. If the second pressing for the bonding of the skin 18 is performed in this state, a significantly excessive pressure is applied particularly to the aforementioned bulged or dented areas of the substrate 12, resulting in local deformation and/or crush of the substrate 12. Furthermore, an excessively strong pressure at this operaion unduly promotes the heating effect and, hence, tends to cause insufficient adhesion (due to an excessive lowering in the viscosity of the melted adhesive) and even damage by heat to the skin 18.

In FIG. 5, the hot-press A of FIG. 2 is supplemented with several sets of clearance adjustment mechanisms F which are arranged circumferentially of the dies 22 and 24 at approximately equal intervals (usually to respectively be located at the four corners of the press A). Each of these mechanisms F has a stopper 72 which stands on the stationary die 22 to determine the lowermost position of the movable die 24, that is, the magnitude of the clearance 26. Adjustment of the magnitude of the clearance 26 means the adjustment of the height of the stopper 72. In this case, the height of the stopper 72 is fixed such that the clearance 26 has a magnitude $t_1$, which is suitable for the press-forming of the substrate 12, when the movable die 24 contacts the stopper 72 as shown in FIG. 6. A pneumatic or hydraulic cylinder 74 is horizontally supported by a stand 76, preferably with the interposal of a vertically bouncing spring, on the outside of the dies 22 and 24. A piston rod 78 of this cylinder 74 can extend towards the stopper 72 and horizontally holds a spacer 80 at its end. The position of the cylinder 74 in a vertical plane is such that the spacer 80 moves along the upper end face of the stopper 72, preferably with a small clearance therebetween so as to never collide against the stopper 72, when the piston rod 78 is extended. The spacer 80 has a thickness $t_2$ which may approximately be equal to the thickness of the skin 18 or slightly smaller taking into consideration the magnitude of pressure needed for accomplishing the bonding of the skin 18 to the substrate 12.

When the piston rod 78 is extended by actuating the cylinder 74 by means of the aforementioned control unit (not illustrated) in advance of the second time lowering of the movable die 24, the spacer 80 is placed on the upper end face of the stopper 72 as shown in FIG. 7, so that the magnitude of the clearance 26 is increased to $(t_1+t_2)$. This means substantially a temporary increase by $t_2$ in the height of the stopper 72. The lowering of the movable die 24 for pressing the skin 18 against the shaped substrate 12 is accomplished in the state of FIG. 7, so that a suitable pressure can be applied to the skin 18 without exerting an unwantedly great pressure on the substrate 12. Accordingly this operation causes practically no deformation of the shaped substrate 12.

FIG. 8 shows a unique technique for satisfactorily achieving the bonding of the skin 18 to the shaped substrate 12 particularly when the magnitude of the clearance 26 is not uniform over the entire area of the die face 22a. The hot-press A is provided with the stoppers 72 and the horizontally movable spacers 80 also in this case. In addition to the enlargement of the clearance 26 by means of the spacers 80, a pad 82 is interposed between the skin 18 and the movable die 24 at the pressing operation for the adhesion of the skin 18 to the shaped substrate 12. This pad 82 is used for realizing a uniform distribution of a press loan over the entire area of the substrate 12 despite the existence of certain nonuniformity in the height of the clearance 26. Accordingly the pad 82 is wide enough in plan view to entirely cover the shaped areas of the die faces 22a, 24a and has a soft, easily deformable and resilient structure. For example, an air bag or a suitably thick layer of a cushioning material such as urethane foam is used as the pad 82. Of course the pad 82 should be introduced into the hot-press A subsequently to the stretching of the material 18A of the skin 18 above the shaped substrate 12 and taken away from the press A prior to the withdrawal of the laminated product 10. In FIG. 8, the pad 82 is suspended by coil springs 84 from pillar-like support members 86 which are designed so as to horizontally be movable aside the hot-press A. For example, the support members 86 have wheels 88 and can move on a pair of rails 90 which are laid to extend horizontally (normal to the plane of the drawing) by the action of driving means such as pneumatic or hydraulic actuators (not illustrated). When the pressure-equalizing pad 82 is employed, the thickness $t_2$ of the spacers 80 is made larger than the thickness of the skin 18 with consideration of the thickness of the pad 82 in a pressed state.

The pressing of the skin 18 against the shaped substrate 12 is carried out with the interposal of the cushioning pad 82 between the movable die 24 and the skin 18, so that the aforementioned nonuniformity in the height of the clearance 26 is absorbed by the deformation of the cushioning pad 82. The presence of the suitably thick spacers 80 on the stoppers 72 assures the exertion of an appropriate bonding load on the skin 18 and the substrate 12, and the pad 82 serves for equalizing a resultant pressure over the entire areas of the skin 18 and the substrate 12. The bonding of the skin 18 to the shaped substrate 12, therefore, can be accomplished without the fear of appreciable deformation of the substrate 12 and/or insufficient adhesion in any areas.

It will be understood from the foregoing description that the use of the pressure-equalizing pad 82 is effective for well achievement of the bonding of the skin 18 to the shaped substrate 12 even when the adjustment of the clearance 26 (by means of the spacers 80, for example) can be omitted because of a small thickness of the skin 18.

What is claimed is:

1. Apparatus for the production of a laminated and shaped trim panel which is composed of a substrate of corrugated paperboard and a skin layer intimately laid on one side of the substrate, the apparatus comprising a hot-press having a stationary die and a movable die;
   a substrate feed means for setting a flat substrate of corrugated paperboard in the stationary die; and
   a skin material feed means for stretching a sheet material employed as the skin above the stationary die while the movable die is parted from the stationary die, said hot-press being provided with a clearance adjustment mechanism to selectively make the magnitude of clearance between the stationary and movable dies in the engaged state correspond to the thickness of the shaped substrate and the total thickness of the shaped substrate and the skin, said clearance adjustment mechanism comprising a stopper attached to the stationary die to make the clearance correspond to the thickness of the shaped substrate, an actuator having a piston rod and a spacer which has substantially the same thickness as the skin and is fixed to the piston rod, the actuator being positioned such that the spacer is placed on the stopped when the piston rod is extended.

2. Apparatus as claimed in claim 1, further comprising a pressure equalizing mechanism which includes a cushioning pad of a soft and resilient structure, a support means for supporting the pad substantially horizontally and a carriage means for selectively, introducing the pad into the hot-press so as to interpose between the stationary and movable dies and taking away the pad from the hot-press.

3. Apparatus as claimed in claim 2, wherein the support means comprise at least two support members and at least two strings of flexible suspension means which suspend the pad from the support members, the carriage means comprising a pair of rails horizontally laid beside the hot-press and wheels attached to the support members to move on the rails.

4. Apparatus as claimed in claim 2, wherein the cushioning pad is an air bag.

5. Apparatus as claimed in claim 2, wherein the cushioning pad is a sheet of urethane foam.

6. Apparatus as claimed in claim 1, wherein the substrate feed means comprise an actuator having a piston rod and a vacuum cup mounted on the free end of the piston rod.

7. Apparatus as claimed in claim 1, wherein the skin material feed means comprise (a) a horizontal shaft for mounting a rolled belt of the sheet material, (b) a first actuator which is held on one side of the hot-press and has a piston rod movable in a vertical plane interposing between the shaft and the hot-press (c) two rolls mounted on the free end of the piston rod and arranged in the style of pinch rolls so as to pass the belt of the sheet material therethrough with the exertion of a friction force, (d) a second actuator which is held on the opposite side of the hot-press and has a piston rod movable in a horizontal plane interposing between the stationary and movable dies in the parted state, (e) a sheet-grasping device mounted on the free end of the piston rod of the second actuator, the first and second actuators being constructed and arranged such that the sheet-grasping device can travel over the entire width of the hot-press and can grasp the free end of the belt of the sheet material when the piston rods thereof are both extended, the second actuator being capable of keeping the piston rod thereof in a partly retreated state such that the sheet-grasping device is stationarily positioned on said opposite side of the hot-press with the free end of the belt of the sheet material grasped therein, and (f) a cutting means including a cutter blade movable in a vertical plane interposing between the first actuator and the hot-press for cutting the stretched belt of the sheet material while the piston rod of the first actuator is extended and the piston rod of the second actuator is kept partly retreated so that the belt is held by the two rolls and the sheet-grasping device.

8. Apparatus as claimed in claim 7, wherein the second actuator is constructed such that the shaped trim panel is withdrawn from the stationary die when the piston rod of the second actuator is fully retreated with the maintenance of the grasping of the skin by the sheet-grasping device.

9. Apparatus as claimed in claim 7, wherein the sheet-grasping device has a pair of jaws having substantially the same width as the belt of the sheet material.

10. Apparatus as claimed in claim 9, wherein the stationary die is hollowed to define a space therein and has a plurality of holes formed therein to connect the space to the shaped face of the stationary die, the hot-press being provided with an air blowing means for blowing air into the space in the stationary die.

* * * * *